United States Patent [19]

Schaeffer

[11] Patent Number: 5,073,971

[45] Date of Patent: Dec. 17, 1991

[54] CELLULAR RADIOTELEPHONE COMMUNICATIONS SYSTEM

[75] Inventor: Dennis R. Schaeffer, Buffalo Grove, Ill.

[73] Assignee: Motorola, Inc., Schaumburg, Ill.

[21] Appl. No.: 402,739

[22] Filed: Sep. 5, 1989

[51] Int. Cl.$^5$ ............................................... H04S 3/16
[52] U.S. Cl. ........................................ 455/33; 379/60
[58] Field of Search ...................... 455/33, 34, 54, 56, 455/67, 69; 379/59, 60, 63; 370/95.1

[56] References Cited

U.S. PATENT DOCUMENTS

| | | | |
|---|---|---|---|
| 4,128,740 | 12/1978 | Graziano | 179/2 EB |
| 4,249,181 | 2/1981 | Lee | 455/50 |
| 4,886,710 | 9/1989 | Schaeffer | 455/53 |

Primary Examiner—Curtis Kuntz
Attorney, Agent, or Firm—Kenneth W. Bolvin

[57] ABSTRACT

A cellular radiotelephone communications system comprising a system of cells that are made up of an array of diretional sector antennas. These antennas are centrally located in the cell and radiates into a 60° area of the cell. Each antenna in a cell has a group of frequencies assigned to it that is different than the group of frequencies assigned to the other antennas within that cell. These frequency groups are repeated either 2 or 8 times respectively in a 4 or 16 cell repeat pattern, effectively forming a two cell reuse pattern. The preferred embodiment of this invention is asymmetrically positioning the repeating frequency groups in an alternating fashion so that one row faces in the opposite direction of another row. The asymmetrical positioning of cells is possible only by departing from the prior art, cellular positioning rules. The positioning rules used in this invention create a 4 or 16 cell repeat pattern by locating co-channel cells closer in one direction than another.

19 Claims, 3 Drawing Sheets

— PRIOR ART —

CELLULAR RADIOTELEPHONE COMMUNICATIONS SYSTEM

FIELD OF THE INVENTION

This invention relates generally to cellular radiotelephone communications systems and in particular to asymmetrical reuse patterns for the cellular systems.

BACKGROUND OF THE INVENTION

A cell in present cellular radiotelephone communications systems typically includes six directional antennas, centrally located in the cell, each radiating into a 60° sector of the cell. A plurality of these cells is combined to form a cellular radiotelephone communications system. This cellular system, covering a metropolitan area, allows mobile traffic to communicate on landline telephone networks while moving through the area.

Communication between the mobile traffic and the celluar system is accomplished using either digital or analog transmission techniques. The digital method digitizes the information before transmission. The analog transmission technique is the prevalent method in use, while digital is now being introduced. Signals transmitted by digital transmission can tolerate a lower threshold of quality, referred to in the art as the Carrier to Interference ratio (C/I), than analog transmitted signals. What is lost in C/I performance can be made up through coding gain.

C/I is a ratio of the signal strength of the received desired carrier to the signal strength of the received interfering carriers. A number of physical factors can affect C/I in cellular systems: building, geography, antenna radiation patterns, mobile traffic transmitting power, and mobile traffic location within the cell.

Due to the low power of the cell's transmitters, the same frequency can be reused in other cells, referred to as co-channel cells, in the same metropolitan area. There are, however, constraints on the location of the co-channel cells. Even though the transmitters are typically low power, placing co-channel cells too close may cause interference. Greater frequency reuse allows more mobile traffic to use the cellular system.

The frequency plan in a symmetrical cellular system, in the sense of which channels should be assigned to each cell, begins with two integers, i and j, that are called shift parameters. The frequency plan is established by starting with a reference cell and moving over i cells along the chain of cells. After reaching the $i^{th}$ cell, a counter-clockwise turn of 60° is made and another move of j cells is made. The $j^{th}$ cell can safely be a co-channel cell. The frequency plan can also be established by moving j cells before turning i cells or by turning 60° clockwise instead of counterclockwise. After all the possible co-channel cells of the initial cell are laid out, another reference cell is chosen and the procedure repeated. This entire procedure is repeated as often as necessary to establish the frequency plan of the entire metropolitan cellular system.

The cells thus established by the above procedure form a reuse pattern of $i^2+ij+j^2$ cells. The number of cells in this reuse pattern is a predominant concern of the cellular industry since this number determines how many different channel groups can be formed out of the frequency spectrum allocated to cellular radiotelephones. A low number of cells in a reuse pattern means more channel groups can be formed and more users accommodated.

Presently, a four cell reuse pattern is one of the densest frequency reuse patterns that produces an acceptable C/I for analog systems (U.S. Pat. No. 4,128,740 to Graziano, assigned to Motorola, describes such a four cell reuse pattern).

Graziano teaches that frequency reuse is a function of antenna beam width antennas and the antennas' spatial relationship with one another. In order to increase frequency reuse, the antenna beam is narrowed from 120° to 60°. Since a 120° antenna beam covers a wider area, it will interfere with more co-channel cells than a 60° antenna beam. A narrower antenna beam, as illustrated in FIG. 1, reduces the area covered by the antenna's radiation pattern. By reducing the beam width and spatially arranging antennas, while remaining cognizant of the power directivity of each and the cumulative power of co-channel interferers, allows greater frequency reuse.

The frequency reuse pattern described in Graziano is a symmetrical reuse pattern. The symmetrical pattern is obtained using the cellular layout procedure described above. In this configuration, each co-channel cell is substantially equidistant from the other co-channel cells. With a symmetrical configuration, cell layout is limited by the frequency reuse equation in the number of different reuse configurations possible.

There exists a need, therefore, to decrease the number of cells in a cellular reuse pattern thereby increasing the number of times a frequency can be reused.

SUMMARY OF THE INVENTION

In accordance with the present invention, there is provided a cellular radiotelephone communications system including a plurality of cells that are made up of an array of directional sector antennas. These antennas are centrally located in the cell and each radiates into a 60° area of the cell. Each antenna in a cell has a group of frequencies assigned to it that is different than the group of frequencies assigned to the other antennas within that cell. These frequency groups can be repeated either 2 or 8 times respectively in a 4 or 16 cell repeat pattern, effectively forming a two cell reuse pattern. This invention recognizes increased frequency reuse through a pattern that is asymmetrical. In other words, the frequencies repeat closer in one direction than another.

One embodiment of this invention is asymmetrically positioning the repeating frequency groups so that they are radiating in the same direction. The preferred embodiment is asymmetrically positioning the repeating frequency groups in an alternating fashion so that they radiate toward one another.

While this invention may produce a lower C/I than the symmetrical positioning of cells, the lower C/I can be tolerated in the digital cellular environment. Digital cellular can use coding gain to compensate for the lower C/I.

BEST MODE FOR CARRYING OUT THE INVENTION

The asymmetrical positioning of cells is possible only by departing from the prior art, cellular positioning rules. The positioning rules used in this invention create a 4 or 16 cell repeat pattern by locating co-channel cells closer in one direction than another.

The asymmetrical configuration yields a lower C/I due to the proximity of the co-channel cells. In a cellular system using analog transmission techniques, the lower C/I might cause a low quality signal to the mobile traffic. A digital cellular system, however, through the use of coding gain, has the ability to tolerate the lower quality signals without degradation of the service provided the cellular mobile traffic. The coding gain makes up for what was lost in C/I.

Figure 1:
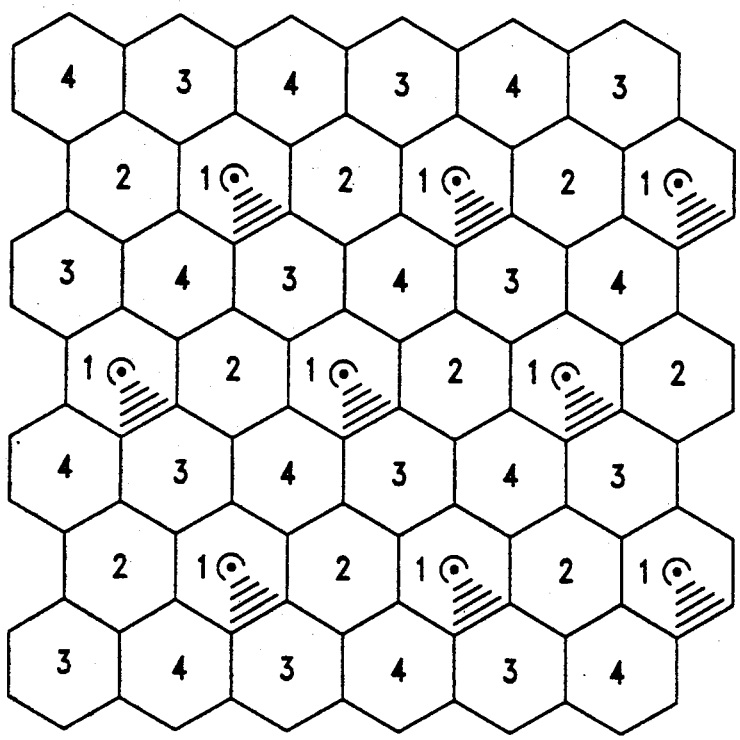
FIG. 1 shows a prior art diagram of an antenna's radiation coverage and its relation to a four cell reuse pattern.
Figure 2:
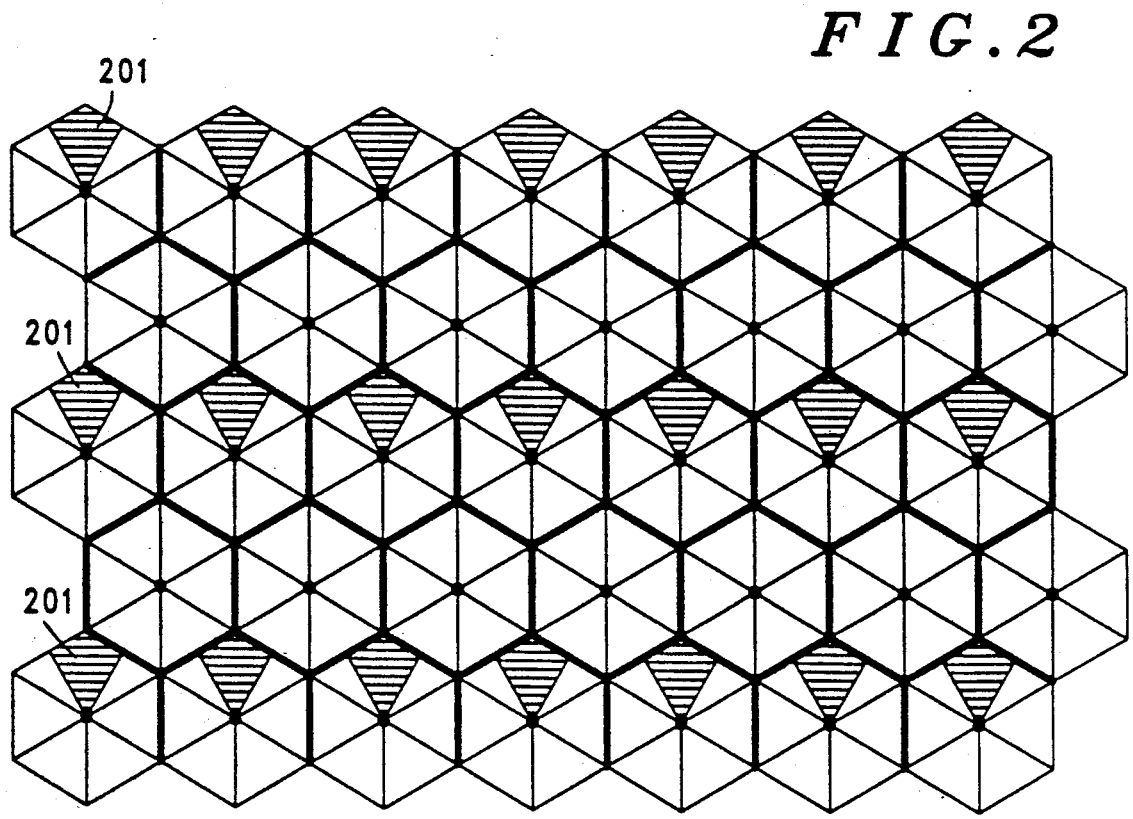
FIG. 2 shows a diagram of a frequency reuse pattern using an alternate embodiment of this invention.

FIG. 2 illustrates one embodiment of this invention. The cells in this configuration are laid out in a two cell reuse pattern where the repeating channel groups (201) face the same direction.

Figure 3:
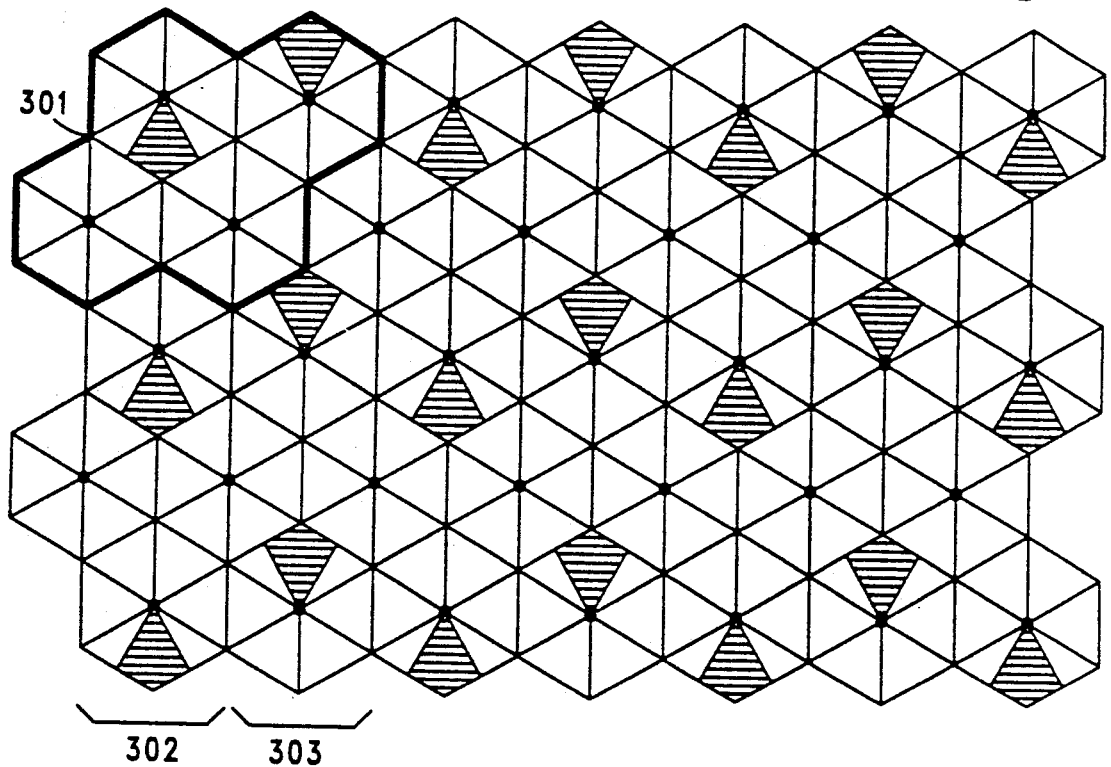
FIG. 3 shows a diagram of a frequency reuse pattern using the preferred embodiment of this invention.

FIG. 3 illustrates the preferred embodiment of this invention. The cells are also laid out in a two cell reuse pattern (301). However, the repeating channel groups of one row of co-channel cells (302) face in the opposite direction of the repeating channel groups of the adjacent row of co-channel cells (303).

In both configurations, the co-channel cells are laid out in an asymmetrical pattern; in this case, co-channel cells are separated by one cell in one direction and are adjacent in the other direction. While these are the embodiments illustrated, other asymmetrical configurations may be possible.

The asymmetrical cell configuration is made possible only by departing from the prior art method for positioning cells for frequency reuse. This invention provides a repeat pattern of either 4 or 16 cells, depending on whether the repeating channel groups face the same direction, with the frequencies reused 2 or 8 times respectively. This, in effect, produces a 2 cell reuse pattern. In other words, while 4 or 16 cells are required before a cell's frequency pattern repeats, within that 4 or 16 cell pattern, a frequency is reused 2 or 8 times. This concept is illustrated in FIGS. 4 and 5.

Figure 4:
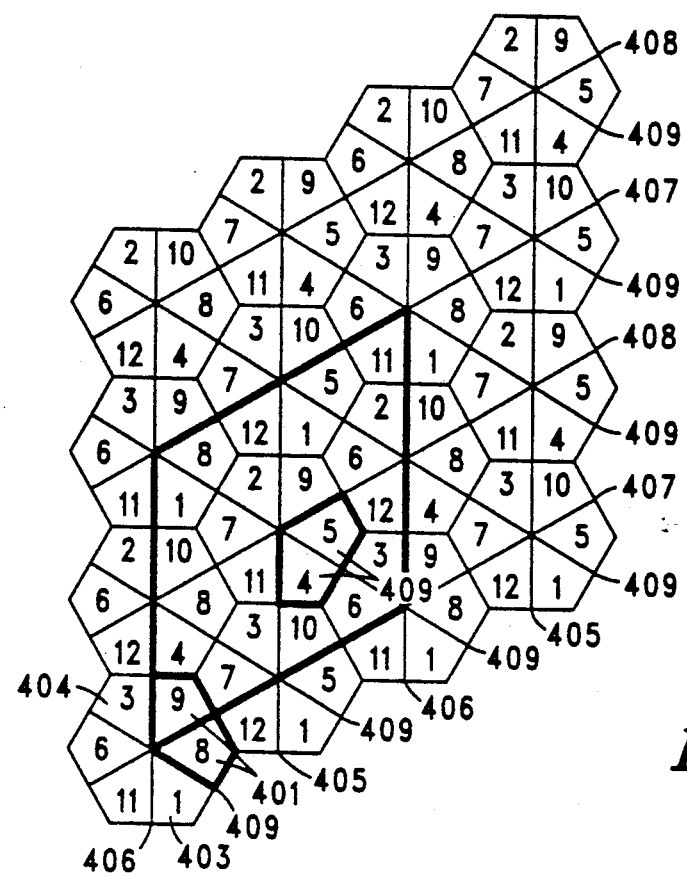
FIG. 4 shows a diagram of the frequency layout of an alternate embodiment of this invention.

FIG. 4, a frequency plan of an alternate embodiment, shows a 4 cell repeat pattern with each frequency used 2 times. A frequency is reused every other cell, producing a 2 cell repeat pattern.

Figure 5:
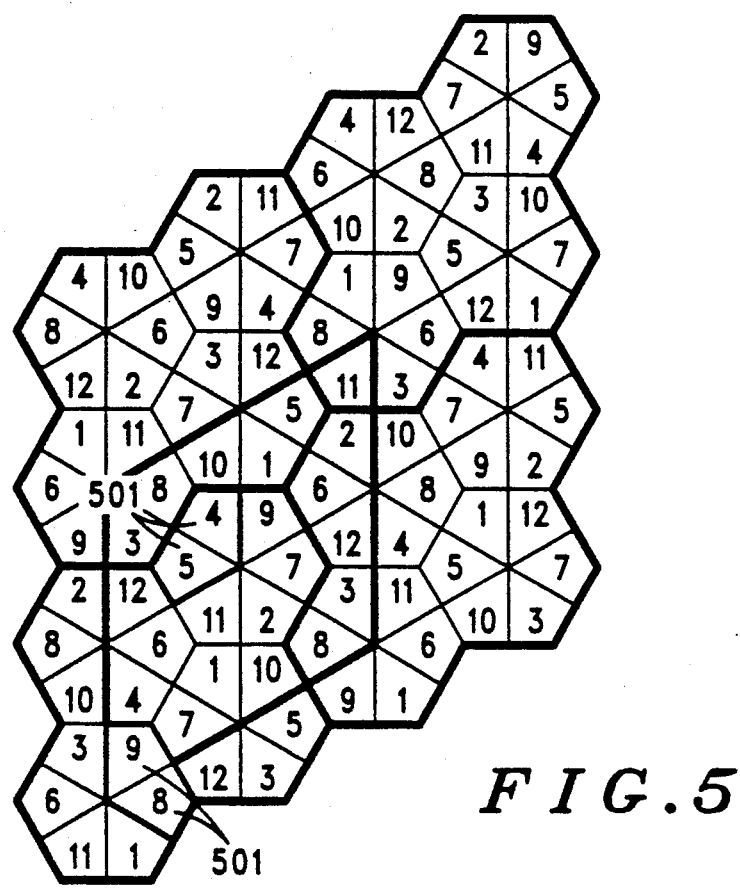
FIG. 5 show a diagram of the frequency layout of the preferred embodiment of this invention.

FIG. 5, a frequency plan of the preferred embodiment, shows a 16 cell repeat pattern with each frequency used 8 times. As in the alternate embodiment, a frequency is reused every other cell, producing a 2 cell reuse pattern. In both embodiments, a cell's frequency layout is not repeated in the pattern.

In any frequency layout scheme using this invention, the frequencies should be configured so as to minimize adjacent channel interference. This is accomplished by establishing a lattice connecting the centers of the cells in the system. This 3 axis lattice is illustrated in FIG. 4. The 12 frequency groups are divided into 3 sets of 4 frequency groups each, each set positioned along a different axis. The 2 odd frequency groups from the first set are established along the first member (407) of the first axis. The first group of frequencies (403) points in the opposite direction from the third group (404). The next parallel member (408) of the lattice contains the even group of frequencies from the first set. This odd-/even pattern is repeated throughout the system of cells to reduce the incidence of adjacent frequency groups.

The second axis of the lattice contains the second set of frequencies. The first member of the lattice (405) on this axis contains the odd frequency groups of the set, the identical frequency groups facing the same direction. The even frequency groups are positioned on the next parallel member (406) of this axis. Again, the identical frequencies face the same direction. This odd/even pattern is also repeated throughout the system.

The frequency groups on the third axis (409) are positioned in the same manner as the first two. The third axis (409) contains the last set of frequency groups. Each identical frequency group faces the same direction with the pattern being repeated throughout the system.

The frequency positioning concept is illustrated in FIG. 4. Frequency groups 1 and 3 are positioned along the first member of the first axis. Groups 2 and 4 are positioned along the next parallel member of the first axis. The second axis contains groups 5 and 7 along the first member of this axis and groups 6 and 8 along the next parallel member. The third axis contains groups 9 through 12 positioned in an identical manner to the first two axis. The odd/even frequency positioning with similar frequency groups facing the same direction is repeated throughout the system.

FIG. 5 illustrates a frequency placement for the preferred embodiment of this invention. This method of frequency group placement is similar to the alternate embodiment placement method, however, in this method, the frequency groups are flipped in alternating cells. In other words, frequency group 1 in the first cell faces the opposite direction from frequency group 1 in the second cell.

The frequency configurations in FIGS. 4 and 5 each result in having occurrences of adjacent frequencies (401 and 501). This condition could result in the frequencies interfering with each other. To alleviate this possible problem, those frequencies can be used as signalling channels in other sectors of that cell. Otherwise, one or the other of the adjacent frequencies can simply not be used.

Figure 6:
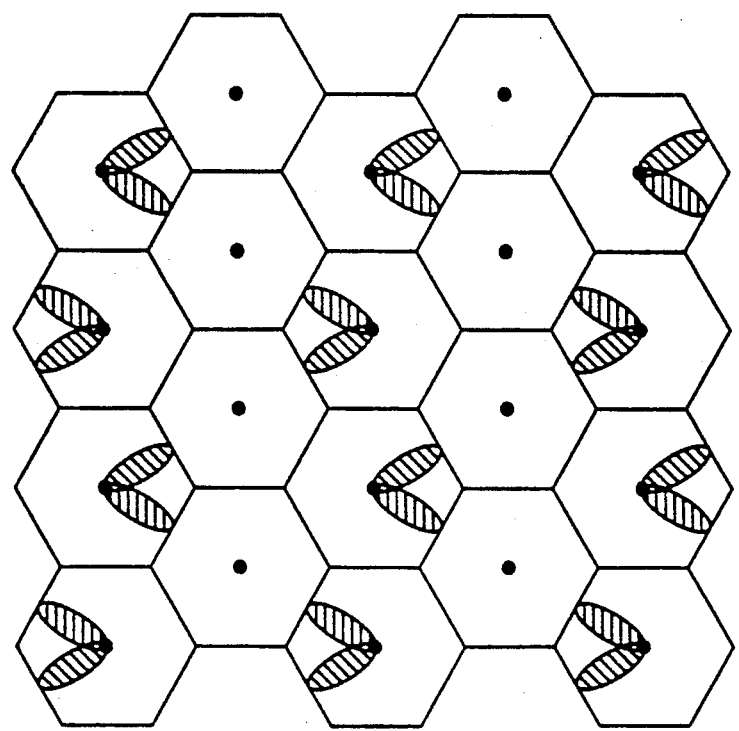
FIG. 6 shows a diagram of the preferred embodiment using sector sharing.

Capacity in the preferred embodiment can be increased by using sector sharing, as illustrated in FIG. 6. In sector sharing, frequencies or frequency groups are shared between at least 2 sectors within a cell. The frequencies are allocated to the sector requiring more frequencies on a demand basis. If the mobile traffic in a sector is beyond the capacity for the number of frequencies in that sector, unused frequencies can be borrowed from lower traffic sectors.

Using asymmetrical frequency configuration, this invention creates higher frequency reuse and, therefore, increased mobile traffic capacity in cellular radiotelephone systems. In order to accomplish this, an entirely new procedure for allocating cellular frequencies was used. The prior art method of symmetrical frequency layout could not provide a dense enough reuse of frequencies for future expansion of the cellular system. This invention provides an asymmetrical layout which allows a frequency to be reused in every other cell, producing a 2 cell reuse pattern and therefore higher frequency reuse in a metropolitan area.

Those skilled in the art will recognize that various modifications and changes could be made to the invention without departing from the spirit and scope thereof. It should therefore be understood that the claims are not to be considered as being limited to the precise embodiments set forth in the absence of specific limitations directed to such embodiments.

I claim:

1. A cellular radiotelephone communications system having a plurality of cells, each cell having a plurality of frequencies, the plurality of cells being located substantially adjacent to each other in a first and a second direction, the system comprising:
   a) at least one frequency, used in a narrow beam, directional manner, assigned to a first cell; and
   b) uniform reuse of the at least one frequency in other cells that are located at a less distance in the first direction than in the second direction from the first cell.

2. The cellular radiotelephone communications system of claim 1 wherein the at least one frequency radiates into at least one 60° sectors of the cell.

3. The cellular radiotelephone communications system of claim 1 wherein the at least one frequency is dynamically allocated between sectors of the cell.

4. The cellular radiotelephone communications system of claim 1 wherein each cell is assigned at least one predetermined group of frequencies.

5. The cellular radiotelephone communications system of claim 4 wherein reused frequencies radiate in a substantially same direction.

6. The cellular radiotelephone communications system of claim 4 wherein a first frequency of a first group of reused frequencies radiate in substantially opposite directions.

7. A cellular radiotelephone communications system having a plurality of cells, the plurality of cells being located substantially adjacent to each other in a first and a second direction, the system comprising:
   a) at least one group of frequencies, each frequency of the group of frequencies used in a narrow beam, directional manner, assigned to a first cell;
   b) uniform reuse of the at least one group of frequencies in other cells that are located at a less distance in the first direction than in the second direction from the first cell.

8. The cellular radiotelephone communications system of claim 7 wherein each frequency of the at least one group of frequencies radiates into at least one 60° sector of the cell.

9. The cellular radiotelephone communications system of claim 7 wherein at least one frequency of the at least one group of frequencies is dynamically allocated between sectors of the cell.

10. The cellular radiotelephone communications system of claim 7 wherein reused frequencies radiate in a substantially same direction.

11. The cellular radiotelephone communications system of claim 7 wherein a first frequency of a first group of reused frequencies radiate in substantially opposite directions.

12. A cellular radiotelephone communications system having a plurality of cells, the plurality of cells being located substantially adjacent to each other in a first and a second direction, the system comprising:
   a) a plurality of frequency groups, a first frequency of a first frequency group radiating into a 60° sector of a first cell;
   b) the first frequency of the first frequency group radiates in a substantially opposite direction from the first frequency of a second frequency group; and
   c) uniform reuse of the first frequency group in other cells at a less distance in the first direction than in the second direction.

13. A cellular radiotelephone communications system having a plurality of cells, each cell having a plurality of frequencies, the plurality of cells being located substantially adjacent to each other in a first and a second direction, the system comprising:
   a) at least one frequency, used in a narrow beam, directional manner, assigned to a first cell; and
   b) non-interfering reuse of the at least one frequency asymmetrically about the first cell.

14. The cellular radiotelephone communications system of claim 13 wherein the at least one frequency radiates into at least one 60° sector of the cell.

15. The cellular radiotelephone communications system of claim 13 wherein the at least one frequency is dynamically allocated between sectors of a cell.

16. The cellular radiotelephone communications system of claim 13 wherein each cell is assigned at least one predetermined group of frequencies.

17. The cellular radiotelephone communications system of claim 16 wherein reused frequencies radiate in a substantially same direction.

18. The cellular radiotelephone communications system of claim 16 wherein a first frequency of a first group of reused frequencies radiate in substantially opposite directions.

19. A method of allocating communications channels for a cellular radiotelephone communications system, the cellular radiotelephone communications system having a plurality of cells, each cell having a plurality of antennas centrally located in the cell with the antennas radiating into 60° sectors of the cell, the method comprising the steps of:
   a) providing different communications channels to each antenna of the plurality of antennas within a cell;
   b) repeating the communications channels in different, asymmetrically located cells to increase the utilization of the communications channels.

* * * * *